United States Patent [19]

Erickson, Jr. et al.

[11] 4,237,502
[45] Dec. 2, 1980

[54] DISK DRIVE SYSTEM

[75] Inventors: Robert W. Erickson, Jr., Pacific Palisades; G. Randall Stevens, Inglewood, both of Calif.

[73] Assignee: Per Sci, Inc., Los Angeles, Calif.

[21] Appl. No.: 56,243

[22] Filed: Jul. 10, 1979

[51] Int. Cl.³ .................. G11B 21/08; G05B 13/00
[52] U.S. Cl. ............................ 360/78; 318/561; 360/77
[58] Field of Search .............. 360/78, 77, 97–99, 360/135; 318/561, 594, 632, 653, 617, 687

[56] References Cited

U.S. PATENT DOCUMENTS

| | | | |
|---|---|---|---|
| 3,699,555 | 10/1972 | Duvall | 360/78 |
| 3,838,457 | 9/1974 | Palmer | 360/78 |
| 4,031,443 | 6/1977 | Droux et al. | 318/561 |
| 4,133,011 | 1/1979 | Kurzweil, Jr. | 360/78 |

*Primary Examiner*—Alfred H. Eddleman
*Attorney, Agent, or Firm*—Smyth, Pavitt, Siegemund, Jones & Martella

[57] ABSTRACT

A disk drive for one or more spinning disks has a voice coil motor, driving the transducer carriage and controlled by two feedback loops, respectively, for hold and seek modes and enabled by a microcomputer which is additionally inserted into the seek mode feedback loop. The microcomputer receives step pulses from a controller host as well as detent pulses through a path of that seek loop; the pulses serve as interrupts and the microcomputer selects digital speed signals on the basis of step and detect pulse counts. An a/d converter inserts that signal as command into the seek loop. The microcomputer performs basically a continuous loop type of program pursuant to which command (select) lines from the host are interrogated and the hold mode is maintained until, for example, one or more step pulses interrupt this program loop to command the drive to move the carriage to another track; the microcomputer then shifts the drive to the seek mode, which is maintained by the continuous loop until the carriage has arrived at the new position. Special subroutines cause the drive to center on a zero track when externally or internally commanded. A variety of diagnostic tests can be performed.

8 Claims, 8 Drawing Figures

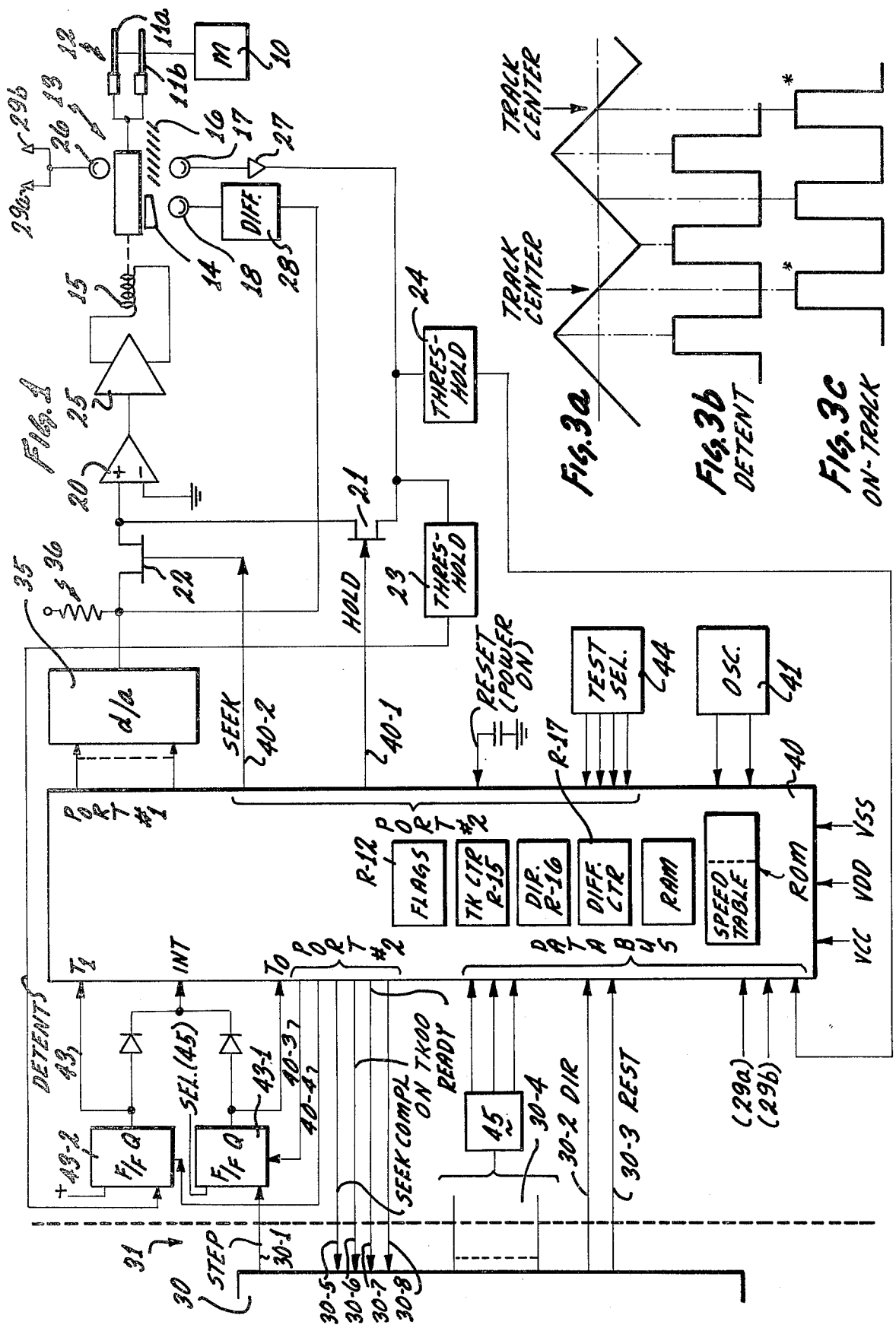

DISK DRIVE SYSTEM

BACKGROUND OF THE INVENTION

The present invention relates to disk file systems and more particularly, the invention relates to the positioning control of one or more transducers relative to the recording surface or surfaces of and in such a disk file system.

Disk file systems form an important portion in computer systems, terminals, minicomputers, or the like. As a whole, they constitute memory extensions and input and output equipment for the main frame of such a facility. Usually, the disk file system includes at least one disk with a magnetic coating on one or both sides, and if the system is of the movable arm variety, a transducer or transducer assembly can be positioned in selected radial distances from the center of rotation of the disk surface. The transducer as so positioned cooperates and electromagnetically interacts with a particular track, also called a cylinder if the particular system includes plural disks or disk packs. Moving the transducer with its arm into alignment with a different track requires usually rapid actuation and movement of the transducer carrier in radial direction to or from the center of rotation. This operation is commonly referred to as a seek operation.

A disk file usually includes a command unit or controller and one or more disk drives, each having a single linear motor for moving the transducer or transducer assembly connected to the command of control unit which, in turn, interfaces with the computer or other digital equipment facility for receiving and accepting data for the purpose of disk file storage. Data retrieved from a disk drive pass also through the control or command unit, usually for storage in a random access storage device of the computer, terminal, etc.

In addition, the control or command unit will receive control commands for purposes of initiating the necessary accessing operation to a particular cylinder in a disk drive. The control or command unit, on the other hand, provides for the particular control of one or more of such disk drives, including control and initiation of any necessary seek operation.

In order to move the or a transducer to a different position pursuant to such a seek operation, the control and command unit will issue particular signals to be used in and by a control circuit for the linear motor in order to move the transducer or transducer assembly from one particular position to another particular position. It is, of course, apparent that these positions are very accurately defined and the motion must be carried out with an accuracy commensurate with the track spacing and width. Moreover, subsequently to such a seek operation, it is necessary to retain the transducer or transducers in centered positions above the respective track.

The motor driving the carriage is usually controlled in several different feedback operations. During a seek a speed command signal is formed from pulses (called step pulses) furnished by the command unit and representing the number of tracks across which the carriage transducer is to be moved. The carriage, in turn, signals back pulses (called detent pulses) representing the tracks across which the transducer actually moves. The speed command signal is formed from a difference in counts of the step and detent pulses. Another feedback signal is a speed signal of the carriage to be compared with the speed command signal as generated to stabilize movement of the carriage into the desired position. The third feedback is used to position the carriage in a centering position as far as the transducer-track relation is concerned; a position feedback is generated for that purpose, involving a grating on the carriage and a stationary pickup. The recurring pattern of the grating is used to generate the detent pulses and portions of the gratings are used to generate the position feedback signal.

DESCRIPTION OF THE INVENTION

It is an object of the present invention to provide a new and improved control circuit for the transducer carriage motor in a disk drive system particularly for drives using flexible disks.

It is a particular object of the present invention to improve a triple feedback system for the control of the transducer carriage motor in a disk drive.

It is another particular object of the present invention to improve the execution of a seek command in disk drives and to further improve the changeover from a seek operation to a hold and position centering operation.

It is a specific object of the present invention to improve a disk drive system which includes a carriage for one or more transducers cooperating with one or more spinning disk surfaces, the carriage being movable radially for positioning the transducers above one of a plurality of concentric tracks on the disk or disks; the carriage is being driven by an electric motor, preferably a so-called voice coil motor which is under control of a control circuit which, in turn, receives various command signals; e.g., from a control unit, including pulses representing the number of tracks across which the transducers are to be moved, a signal defining the direction of such movement and other signals relevant for recording and data retrival.

In accordance with the preferred embodiment of the present invention, it is suggested to provide a control circuit for the motor driving the transducer carriage in which the position of the carriage is represented by a periodically variable signal from which detent pulses are derived, and these pulses together with the step pulses are used as interrupt signals in a microcomputer. These interrupt pulses trigger internally separate acquisition routines respectively to increase and decrease the content of a register holding in any instant the difference between the number of step and detent pulses received. The microcomputer normally executes a program loop pursuant to which either a seek mode signal or a hold mode signal is outputted; when issuing a seek mode signal the loop also causes a digital number to be outputted in response to the said difference and this number is converted into an analog speed command signal, to be combined with an analog feedback signal from the carriage in a speed feedback loop whose effectiveness is controlled by the microcomputer via the seek mode signal. In the hold mode, the hold mode signal from the microcomputer enables a position feedback loop which autonomously controls the position of the carriage transducer to remain above the particular track. This mode is terminated by the microcomputer when its interrupt channel receives step pulses or when the control unit commands a restore operation pursuant to which the carriage is to place the transducer(s) above a particular track(s), which is, in effect, a special seek operation.

The microcomputer additionally receives select signals from the control unit if more than one disk drive is connected to the control unit. Moreover, the microcomputer receives particular position signals from the carriage-disk system. The microcomputer furnishes, in addition to the seek and hold mode signals, status signals for signalling to the control unit that a commanded seek has been completed, that the transducer has been placed above the particular "restore" track, and that the device is ready for operation. The ready status is arrived at by the detection of index holes in the disk whose frequency is determined and monitored by the microcomputer program to determine whether or not the disk spins at the proper speed.

In view of the fact that the microcomputer is inserted into the feedback loop for speed control, real time operation is needed here. Therefore, the difference register is decremented immediately after acquisition of a detent pulse as part of the interrupt routine. Also, as soon as the difference is reduced to zero, the hold mode is entered to immediately stabilize the transducer above the new track.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a block diagram of a disk drive in accordance with the preferred embodiment of the present invention;

FIGS. 3a-3c show several signal diagrams, the signals being developed in the system of FIG. 1.

Proceeding now to the detailed description of the drawings, FIG. 1 illustrates a disk drive which includes a motor 10 for spinning one or two disks, 11a and 11b; these disks are permanently or selectively connectable to the driving shaft of motor 10 by means of a suitable clutch arrangement. The disks are presumed to be of the flexible variety; they are frequently referred to as floppy disks. Each of these disks has two magnetizable surfaces and each such surface cooperates with a transducer, there being four transducers 12, accordingly. The information stored on these surfaces are concentric as to each disk, while tracks having the same radial distance from the axis are necessarily located in a cylinder. A particular position of the carriage and of the transducers 12 can, therefore, be defined also by a cylinder whose axis coincides with the axis of motor 10.

Figure 2A:
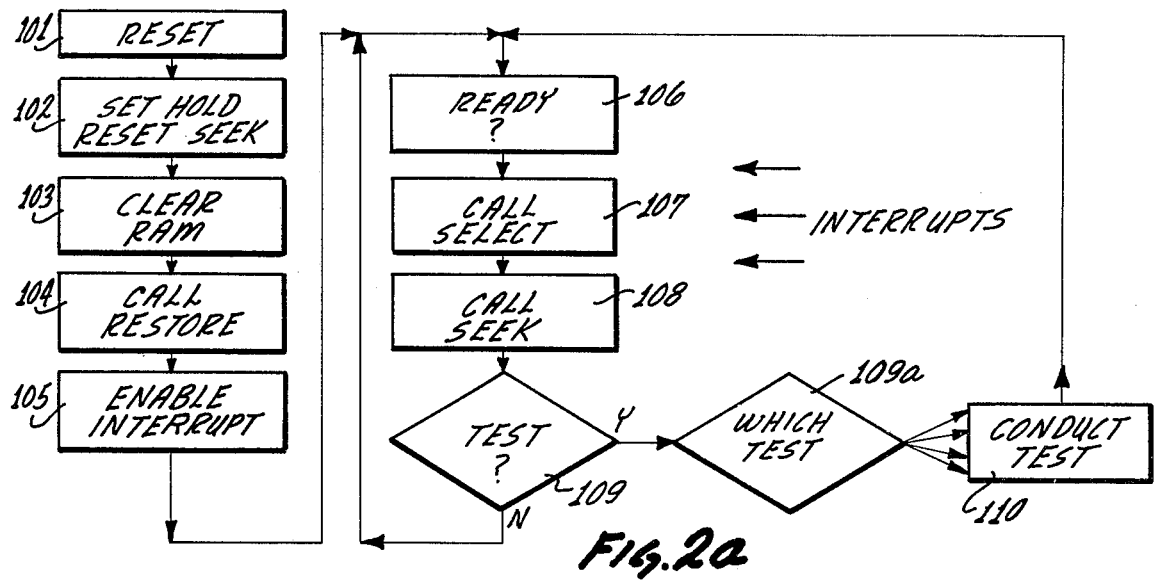
FIGS. 2a through 2d are flow charts for a program executed by a microcomputer which is included in the system shown in FIG. 1.

The transducers 12 are mounted on a carriage 13 which is moveable in radial direction as far as the disks 11a and 11b and their common axis or rotation are concerned. The carriage 13 is driven by a linear motor such as a voice coil motor 15 as is known for such disk drives. The voice coil motor 15 is under control of circuitry which is and includes the subject matter of this invention. The carriage 13 is provided with a grating 16 being affixed thereto and moving therewith. A first stationary transducer 17 monitors the grating. The transducer 17 is connected to an output amplifier 27, and upon passage produces a triangular or near triangular wave pattern as depicted in FIG. 3a. The diagram shows transducer output plotted against radial displacement, in radial outward direction of the grating vis-a-vis transducer 17.

A full wave length of this triangular signal pattern represents the track center to track center spacing of the magnetic tracks as inscribed upon the disks. Particularly, one type of zero crossing, for example, the one resulting from a transition from positive to more negative values upon displacement in radial (outward) direction, represent a track center position; that is to say, if the signal of transducer 17 passes the zero level from positive to more negative values, while the carriage 13 is moved radially outwardly, the transducer 12 passes across a track center. The other zero crossings of the wave signal occur when the transducers 12 passes across a midpoint between two adjacent concentric tracks or cylinder.

The output of the amplifier 27, which provides the sawtooth signal as shown in FIG. 3a, is also applied to two amplifier circuits 23 and 24, each having distinct threshold characteristics. These two circuits respond to particular portions of the wave train whereby particularly the circuit 23, being comprised of two threshold detectors, responds to nearpeak values of the sawtooth signal irrespective of the polarity. Thus, as the carriage moves in one direction or the other and the transducer 17, in cooperation with the amplifier 27, provides the sawtooth signal, a train of pulses is produced in which each pulse begins prior to a negative or positive peak and ends subsequently thereto (FIG. 3b). These are the detent pulses, and it is readily understood that two such pulses are produced per track passage.

The amplifier system 24 has a different threshold behavior; it also produces pulses and each of them begins just prior to any zero crossing and ends subsequently thereto (FIG. 3c). Specifically, the output pulses of amplifier system 24 are indicative that a transducer 12 is within a narrow range of a track center; for example 1 mill or less. This holds true only for every other pulse, namely those straddling a zero crossing of the triangular wave and are denoted by (*); they will be called near-track pulses, or on-track pulses. The pulses in between occur when the transducer 12 is about halfway between two tracks; these pulses are not used.

Whenever the carriage 13 is moved towards a track in a radial outward direction, a detent pulse occurs (amplifier 23) on a positive or a negative peak. Every second detent pulse has a trailing edge which occurs before the next near-track pulse (amplifier 24) and, thus before the next track-center-defining zero crossing. The system is designed so that the trailing edge of such a detent pulse occurs, for example, 2 mills before the track center, that is one mill before the leading edge of the next near-track pulse.

Whenever turned on, the drive as a whole is either in the so-called hold or position mode or in the so-called seek mode. In the hold mode, the triangular wave output signal of transducer 17 serves as position feedback signal and is fed back via amplifier 27 and a hold mode gate 21 to a summing point amplifier 20. The output of this amplifier feeds a power amplifier 25 which, in turn, drives the voice coil motor 15.

It should be observed that the triangular signal (FIG. 3a) has linear branches around each zero crossing, and within that limited range, the signal of transducer 17 is per se an error or deviation type signal so that it is immediately and directly useable for feedback control to center the carriage 13 in a position in which the output signal by the transducer 17 is at or near such a zero crossing so that, in turn, each of the transducers 12 is positioned above the respective individual tracks, all of which being on a cylinder.

In the seek mode, the voice coil motor 15 moves carriage 13 from a position of transducer 12 above particular tracks (a particular cylinder) to positions above different tracks on a different cylinder. In the seek mode, motor 15 is controlled to provide for the requisite movement in accordance with a speed command signal which is derived from a microcomputer 40 via a digital to analog converter 35 and in combination with an offset current source 36 for zero shifting. Conveniently, converter 35 provides a zero output for a maximum speed in one direction, and a maximum output of one polarity for a maximum speed in the opposite direction. The zero shifting and offset source 36 provides a current equal to half the maximum output of 35, so that the sum total represents a bidirectional, bipolar speed signal that varies in a range from minus half the maximum output of 35 to plus half of that maximum output.

This speed command signal is combined with a speed feedback signal in a speed, velocity, or seek mode loop. For this, carriage 13 carries a contrast wedge 14, being scanned by a transducer 18 whose output is differentiated by a circuit 28. The output of circuit 28 is thus a signal which represents the actual instantaneous speed of the carriage. The signal has a polarity that is indicative of the direction of movement of the carriage. Thus, the combination 14, 18 and 28 represents a velocity meter for the carriage. The output of this velocity meter or tachometer is fed to the summing point amplifier 20 via a gate 22. This gate 22 permits passage of the speed feedback signal to the amplifier 20 when enabled by a seek mode signal.

The speed command signal is (negatively) summed with the feedback signal from circuit 28. In fact, the summation is such that the speed feedback signal is subtracted from the speed command signal from the analog to digital converter 35 as offset by 36, and this difference is of a particular polarity which in one instance will serve to cause motor 15 to accelerate, and in different instance it will cause the motor to decelerate, whereby deceleration, as far as radial movement in one direction is concerned, is equivalent to acceleration in the opposite direction and vice versa.

The portion of the circuit as described is basically conventional but the mode signals for the gates 21 and 22 and the speed command signals are derived from the microcomputer 40 as will be described more fully below.

The drive, and here particularly the device associated with the carriage 13, includes additionally a detector, 26, which responds to particular positions of the transducers 12 in relation to the outermost track and cylinder, called track 00. Detector 26, in conjunction with a first threshold device 29a, provides the signal TK00 when the transducers are, in fact, on that track. Detector 26, in conjunction with a second threshold device 29b, responds to a position of the carriage in which the transducers 12 are outside of the range of tracks. The signal provided by the detector 26, 29b is called TKS and represents specifically the situation that the carriage has a position being radially more outward than the outermost track 00, i.e. the transducer drive overshot.

Before continuing with the description of the drive circuit and its operation, reference is made to the fact that the drive as a whole is connected to a controller 30 via an interface 31. The controller 30 itself receives, for example, information from a computer, a minicomputer or the like, for the purpose of causing data to be stored on one of the disks while at different times the controller receives requests from such computer for purposes of extracting data and information from one of the disks. As far as the controller is concerned, it is presumed that the controller issues the following signals through that interface.

The first type of signals issued through a line 30-I are called step pulses. These are pulses appearing at a particular rate and in a particular number. They appear in this line, so to speak, unannounced, to signal to the drive the number of tracks across which the transducers are to be moved from the current position to a new position. These pulses are issued by controller 30 in response to particular commands received from the computer, and they represent the track differences to be covered and traversed pursuant to a seek mode which will then be established (infra).

Another signal crossing interface 31 in a line 30-2 represents the direction of movement, distinguishing by means of two signal levels between a radially inward direction and a radially outward direction as far as the carriage transducer displacement is concerned. A line 30-3 receives from controller 30 a signal which indicates that the drive is to cause the carriage to return to a zero position such as above the track 00; this position will be used as a track reference position. The signal in this line 30-3 is also called a restore command.

A group of lines, or device address bus 30-4, serves to select the particular drive or no to select the particular drive. Controller 30 may serve a number of drives and various interface lines including the ones mentioned earlier are shared by the various drives, but they should be accepted by a particular drive only when, in fact, that drive has been addressed and selected and the group of lines 30-4 provides the requisite address. How these input lines for the drive are being used in the drive will be described shortly. Suffice it to say presently that, directly or indirectly, these lines serve as inputs for microcomputer 40.

The drive, in turn, issues signals across interface 31 to the controller for purposes of signalling the operating state of the drive to the controller. These signals pass particularly in four output lines 30-5, 6, 7 and 8. The signal in line 30-5 represents that the drive has completed a seek operation, i.e. has arrived at the desired track. Another line (30-6) signals when and if the drive is on track 00 Another line, 30-7, signals that the drive is or is not ready. Not ready means that for one reason or another the speed of the motor 10 deviates from a speed range in which proper read and write operations cannot take place. The fourth line (30-8) is mentioned here only for purposes of completion and indicates whether or not the drive services a one sided disk or a two sided disk. There are no other interface lines. All these interface lines as well as others lead to or from the microcomputer 40.

By way of example, it is assumed that the microcomputer is of the variety traded as a single chip by the Intel Corporation under the designating number 8048. As far as the particular chip is concerned, the following general remarks are in order. This particular microcompurter is an 8-bit microcomputer having a programmable ROM of a 1K-byte capacity and further having a 64-byte RAM. The microcomputer 40 has a number of registers, several of them are used as scratch registers for aiding in the execution of the program. The register R-15 is used as absolute track counter, i.e. the content, so to speak, tracks in absolute terms the position of the transducers 12. The register R-16 is used only to indicate the direction signal as applied by the controller to the drive via the interface line 30-2. The register R-17 is the difference counter, i.e., it contains at any instant a number which represents (without sign) the difference between the current position of the transducers 12 and the desired position in units being twice the number of tracks in-between the two positions. In other words, if the transducers 12 are currently above track (and cylinder) number x, and the carriage drive is to move the transducers to track y, the number held in register R-17 is $|2(x-y)|$. For purposes of convenience, several registers are used as a flag; among them the register R-12. Three stages of R-12 are used as flags. Stage R-12-3 indicates whether or not a seek operation has been completed; R-12-2 represents whether or not the system is on the track 00. Stage R-12-0 indicates whether or not currently the content of the difference registers R-17 is 0.

One of the major components of the microcomputer 40 is a portion of its ROM memory (or PROM) which contains a table realizing a particular velocity as a function of the track number difference to be traversed. The table, in fact, contains descrete speed values (on an arbitrary scale) out of which a velocity profile is composed during each seek operation when the carriage is to move the transducers 12 from one track cylinder to a different one, the determining criterium being the number of tracks still to be traversed in any instant. Moreover, the initial command for such a seek is established by a series of step pulses which, while the transducer is still at rest, builds up that difference in register R-17 in steps (see step pulse interrupt routine below), and for each such difference value the table provides a different speed value to be used as command in the motor control circuit. Basically, the values in that table realize a formula in which the velocity is proportional to the square root of that difference number. The following remarks, however, are in order.

First of all, it was found more practical to use a close approximation of this formula only up to a certain difference; for larger differences the same constant maximum velocity is being used. The command velocity will remain constant for as long as the track difference is above that value and will begin to drop only, if the difference is below that maximum value. Moreover, it was found advisable to modify the formula slightly at the lower end, and to reduce the velocity to a smaller value when the track differences are about one or less, so that the voice coil motor creeps into the position in which the transducers will then be held by the hold mode. A track difference zero results, of course, in a command velocity zero and there is no danger of an overshoot.

The chip has two input and output ports of which port #1 has its 8 lines connected as input to the digital to analog converter 35. Four lines of the second port are, in this particular mechanization, connected to an expander circuit, for example, of the variety traded on the designation 8243. For facilitating description, block 40 in FIG. 1 is assumed to include the expander chip. Thus, the respective lines, to the extent they are used, will simply be identified as lines of the second port with the understanding that some of them are not directly connected to the microcomputer but run through the expander chip. These lines of port #2 involve particularly lines 40-1 and 40-2, respectively, for the hold and seek mode signals and other signals and lines to be introduced later. The lines 40-1 and 40-2 are, respectively, connected to the gates 21 and 22. Thus, the microcomputer provides on a permanent basis these enabling signals, one at a time. Additional lines of port #2 are connected to the interface lines 30-5 through -8 which signal status signals from the drive to the controller.

The chip 40 has additionally a data bus and the various data lines, altogether eight, are connected in various ways, among them being three data lines connected to a select logic device address decoder 45. The latter is connected to the interface bus 30-4. Decoder 45 has four output lines, three of which are connected to three data lines. Respective two of the three decoder lines from unit 45 select one or the other of the two disks 11a, 11b which can be serviced by the unit. The third line signals when neither of the disks has been select so that the drive can ignore the other interfaced signals which the host control issues. The fourth output line of decorder 45 is connected to the interrupt interpart select (infra).

Three other data bus lines are connected to the components 24, 26 and 29 to respectively feed to the data input of the microcomputer signals representing absence or presence of the transducer within a 1 mill range of a track (24); absence or presence of the transducers 12 on the particular tracks TK00 (26); and whether or not the transducers are positioned outside of the range (29). Two of the data input lines are respectively connected to receive the direction and restore signals from controller 20 via lines 30-2 and 30-3 as traversing the interface 31. The direction signal in line 30-2 usually accompanies one or more step pulses in line 30-1; the restore signal is an independent command.

The microcomputer 40 has an interrupt input INT and two terminals $T_0$ and $T_1$ which are sofe-ware associated with the interrupt; an interrupt control circuit 43 is connected thereto. The interrupt circuit 43 includes two flip-flops (43-1) and (43-2). The Q-outputs of these flip flops are respectively connected to the identifying input $T_0$ and $T_1$ of the chip 40. Additionally, the two outputs are OR'd together to provide a common input to the interrupt input INT of the chip 40.

The clock inputs of the two flip-flops 43-1 and 43-2 are, respectively, connected to interface line 30-1 to receive the step pulses, and to the output line of circuit 23 whichproduces the detent pulse as was described earlier. The set enable (or -d) input of the flip-flop 43-1 receives a select signal from device address decoder 45 so that this input is permanently enabled, as long as controller 30 chooses to cooperate with this particular drive, permitting setting of the flip-flop whenever the clock signal in line 30-1 (step pulse) for flip-flop 43-1 has a falling edge.

The set enable input for flip-flop 43-2 is permanently gated on, so that the trailing edge of any detent pulse, serving as clock for this flip-flop, can set the flip-flop. A detent occurs (a) immediately after the transducers 12 on the carriage are within 2 mills of a track center. A detent pulse occurs also when the transducers are within 2 mills of a mid-point on a radial line between two tracks.

The two clear inputs for the two flip-flops 43-1,2 are respectively connected to two outputs 40-3 and 40-4 of the expanded port of the microcomputer for asynchronously resetting the respective flip-flop as part of program execution.

It appears, therefore, that the two flip-flops are respectively set on the trailing edge of a step pulse and of a detent pulse. The set state is separately signalled to the two inputs $T_0$ and $T_1$, but in either case, an interrupt request is applied to the interrupt terminal INT.

Four additional input lines of the microcomputer (expanded port) are connected to a switch 44 which is manually adjustable switch and is provided for purposes of selecting and electing specific tests or a no-test condition or state. Depending upon the switch setting, the microcomputer 40 causes the drive to undergo and undertake certain diagnostic tests and exercise functions as will be described later. Alternatively, the switch setting may indicate that no test is to be conducted.

The microcomputer 40 is additionally connected to an external oscillator 41 to receive a crystal stabilized signal from such an oscillator. The chip receives also the usual power supply signals VCC, VSS and VDD at the appropriate signal levels such as five volts and ground in this instance. Additionally, the reset terminal of the chip is connected to a capacitor to obtain a gradual charge-up upon power-on for setting up operation of the chip.

Turning now to FIG. 2A, the flow chart depected in this figure represents the basic operational routine which the system, including the microcomputer, undertakes during normal operation. Following the turning on of power, the input for the reset terminal of the chip becomes effective instituting a 20 millisecond delay before the program begins. Internally, the computer shifts to a particular starting location to begin the operation (block 101). In accordance with block 102, the system is set to be in the hold mode and not in the seek mode. To avoid unwanted movement of motor 15 on account of any undefined speed signal that may happen to appear at the output of the converter 35, the external feedback loop which includes the gate 21 is opened and the motor drive system will be permitted to stabilize in the hold mode and in any position it may have. Prior to any further operation, the entire RAM is cleared (block 103), whereupon the program continues to call for the restore routine (block 104).

The restore routine will be described below; suffice it to say presently that its primary function is to cause the carriage 13 to move the transducers 12 to face tracks 00. Moreover, at the end of the restore routine, the interrupt channels are enabled so that the drive may receive commands (step pulses) for moving the carriage to other positions or the transducers 12 above particular tracks. Interrupt enabling has nothing to with drive selection; this enabling is strictly internal as far as microcomputer 40 is concerned. Next, the system exits to the normal operation which basically involves the following main program loop 106 to 109.

As per block 106 the so-called ready routine is carried out which is described only briefly. Suffice it to say that the microcomputer 40 determines by means of the ready routine whether or not apertures of the spinning disks occur at the desired rate. Particularly, an internal time counter counts clock pulses and references that time count against the appearance of apertures of the spinning disks past a detector (not shown). The aperture pulses (index pulses) as provided by the detector must occur within a particular range of counted clock pulses, and if that is, in fact, true, the microcomputer sets the ready flags. If the ready signal does not appear, operator intervention and other, for example, diagnostic procedure is necessary. The ready routine 106, therefore, monitors the speed of the disk by means of software, and this supervision is carried out continuously in the sense that the ready test is conducted during each complete run-through of the main program loop. This way one can catch immediately any defects, any dropping of the speed of motor 10 below a particular value so that the data as they are going to be read from the disk or as they are being recorded on the disk will find the spinning disks to have the requisite speed. The ready state or condition is independent from the position of the transducer 12 and the carriage relative to the spinning disk.

After having tested whether or not the system is ready as far as the disk is concerned, the program of the main loop shifts to block 107 which calls for the select routine. The purpose of this routine will be described briefly. The select routine is a routine which samples the output of decoder 45 in order to determine whether or not the particular drive is selected at all, and if so, which of the disks of the drive are being selected for operation. As will be recalled, other drives may be connected to the interface 31 with the controller 30, and the drives do not have their own, dedicated command input lines such as the line for step pulses, for the direction signal are for the restore command, so that the select routine is needed to determine whether or not the particular drive is selected.

Execution of the select routine results primarily in the interrogation of the output lines of decoder 45 to determine whether or not any of the disks (and which ones) have been selected for cooperation with the controller. The select routine will further sample line 30-3 in order to determine whether or not the controller calls for the restore function. The restore function can be called externally, by the controller upon dropping line 30-3, or internally under various conditions, e.g., initially (104, supra). Presently, finding line 30-3 low, the restore routine will reference to FIG. 2d. Moreover, the select routine causes the status flags to be outputted in that the seek complete flag (R-12-3), the TK00 flag (R-12-2), and a ready flag be applied to lines 30-5, 30-6, and 3-7, respectively. These flags will be applied to the internal lines only after the select test found the drive to be selected.

Irrespective of whether or not the particular drive has been selected, upon completion of the select routine, the main program shifts as per block 108 to the seek routine. The seek routine will be separately described below and with reference to FIG. 2c. In the case the drive has not been selected, the seek routine will establish or reaffirm that this drive system is to remain in the hold mode. Moreover, the seek routine monitors, establishes and maintains among other aspects a condition of readiness as far as the position of the carriage 13 is concerned, to be able to accept commands when selected. When selected, the seek routine establishes whether or not the system is to remain in the hold mode or is to enter or to remain in the seek mode. The main operation control signals for the motor 15 will be generated, updated and maintained pursuant to execution of the seekroutine. Particularly, the velocity profile command to be used by motor 15 to drive the carriage to a different track routine, is generated and built up by the seek routine.

Having completed the seek routine, the main program continues to interrogate the test switches 44 (block 109) to determine whether or not these switches have been adusted to a test condition. If not (negative result of inquiry as per 109), the program loops back to the ready routine 106. In the non-test case, the main loop is completed but is continuously carried out following power-on. If the test switch 44 has been set to a test condition, it is determined as per block 109a which test is to be conducted whereupon the particular test routine is continuously carried out following power on. If the test switch 44 has been set to a test condition, it is determined as per block 109a which test is to be conducted whereupon the particular test routine is called as per block 110. Having completed the selected test, the system returns again to call on the ready routine as per block 106.

Irrespective of the particular normal program operation, the program and any of the foregoing routines may be interrupted by an interrupt signal. The interrupt signal may be the result of a step pulse issued by the controller and having passed through the external interrupt circuit 43, or such interrupt may result from a detent pulse as derived from amplifier 23, and also after having passed through the acceptance circuit 43. However, it will be recalled that the flip-flop 43-1 can be set by a step pulse only, when the drive has been selected. This is not true as far as detent pulses are concerned.

Figure 2B:
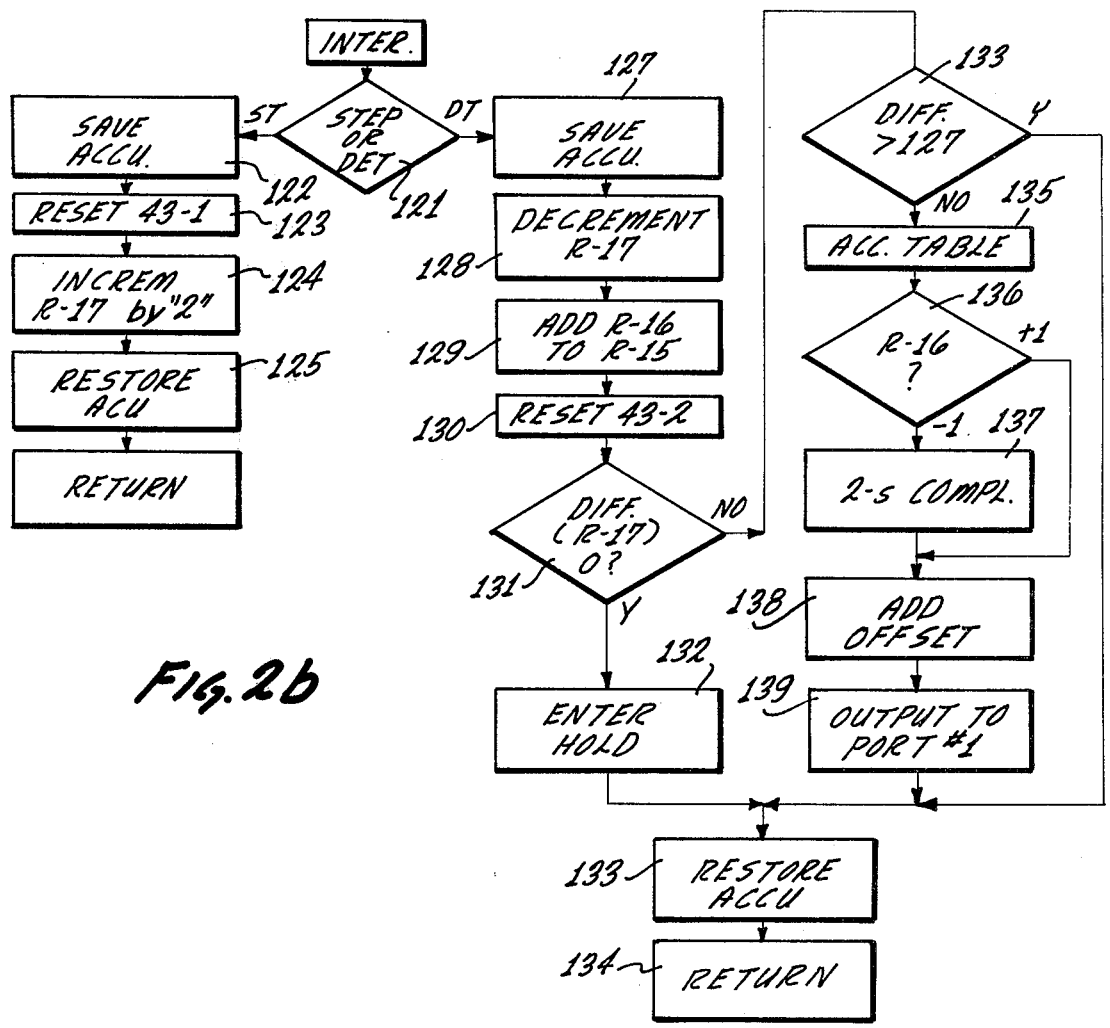

Before we proceed to the description of the interrupt routine as per FIG. 2b, it should be mentioned that the system is designed and the program is set up accordingly, to make sure that none of the step and of detent pulses will be lost. Looking at the FIG. 1, on can see that the flip-flops 43-1 and 43-2 can both be in the set state; they can be placed into the set state independently from each other. The interrupt input for the microcomputer 40 is operated by the set state of either of them, and the interrupt signal may, in fact, at any given time be applied by the OR-gate to the INT terminal because both of the flip-flops happen to be in the set state. Generally speaking, the system must be set up so that one of the interrupts has priority over the other one. The choice may be an arbitrary one of either interrupt can be processed within a period of time which is shorter than the shortest period within which either type of pulse can occur. On the other hand, if the detent pulses are given priority over the step pulse, this choice is or could become a limitation on the host equipment as far as the step pulse rate is concerned. As the step pulses are given priority over the detent pulses, this is or will become a limitation on the speed of the voice coil motor. Presently this system is set up and the program prepared so that a detent pulse takes precedence over a step pulse as far as acquisition thereof by the microcomputer 40 is concerned. This is arbitrary as the interrupt routines associated with the acquisition of either, a step pulse or a detent pulse, require less execution time than the shortest possible rate of occurrence of either type of pulse.

Proceeding now to FIG. 2b, pursuant to the precedence in the acquisition of a detent pulse uppon detection of an interrupt signal at the INT-input of the micro processor, a test is conducted immediately, whether or not the input $T_1$ signals that the detent pulse acquisition flip-flop 43-2 has been set (inquiry 121). If this is not true, the interrupt must have been caused by a step pulse, and the routine shifts to the acquisition of the step pulse. This particular branching assumes that only two causes for an interrupt are possible. If that is not the case, the interrupt could have been requested by another source and this particular branch will then be entered only after the input $T_0$ has been tested and found to be high as a direct indication that, in fact, step flip-flop 43-1 is set. At first, block 122, the current content of the accumulator is saved and stored in an appropriate saving address. Next (block 123), a signal is caused to be outputted by the second port through the expander, line 40-3, to reset and clear the flip-flop 43-1. Next (block 124), the difference register R-17 in the computer 40 is incremented twice, which operation could also be described as adding the number "2" to the content of the difference register R-17. Basically, that is all that is required to acquire a step pulse. Accordingly, as per block 125, the saved content of the accumulator is restored into the accumulator, whereupon the program returns to the interrupted program.

The interrupt routine, and particularly the portion as just described with reference to the lefthand portion of FIG. 2b can, of course, occur at any time by the nature of the interrupt procedure. In fact, when the system is in the hold mode, the first interrupt resulting from a step pulse signals the beginning of a seek. However, in the orderly sequence of operation and periodically with the loop of FIG. 2a, the seek routine is always called upon periodically and executed. The "call seek" portion (108) of the main program loop as per FIG. 2a, will cause a shift from the hold to the seek mode. Moreover, the seek routine generates the speed command signal for motor 15 on the basis of the content of difference register R-17 and to be effective in the seek mode as long as the content of the difference R-17 is non-zero.

Please note that the seek routine is always executed regardless whether or not the system is in the seek or in the hold mode. Thus, this particular seek routine controls basically the mode states as evidenced by the signals in the seek and the hold modes. As stated, the seek routine controls the primary input formation for the digital to analog converter 35, i.e. the initial formation of a speed command signal, particularly following an influx of step pulses. Conversely, the seek routine controls the reversion to the hold mode after the carriage and transducers have arrived at their destination. In addition, a number of flags and other operational indicators are set pursuant to the seek routine. First of all, however, the seek routine whenever called checks on the state of the drive. Due to the loop (FIG. 2a) this check is frequently repeated.

Figure 2C:
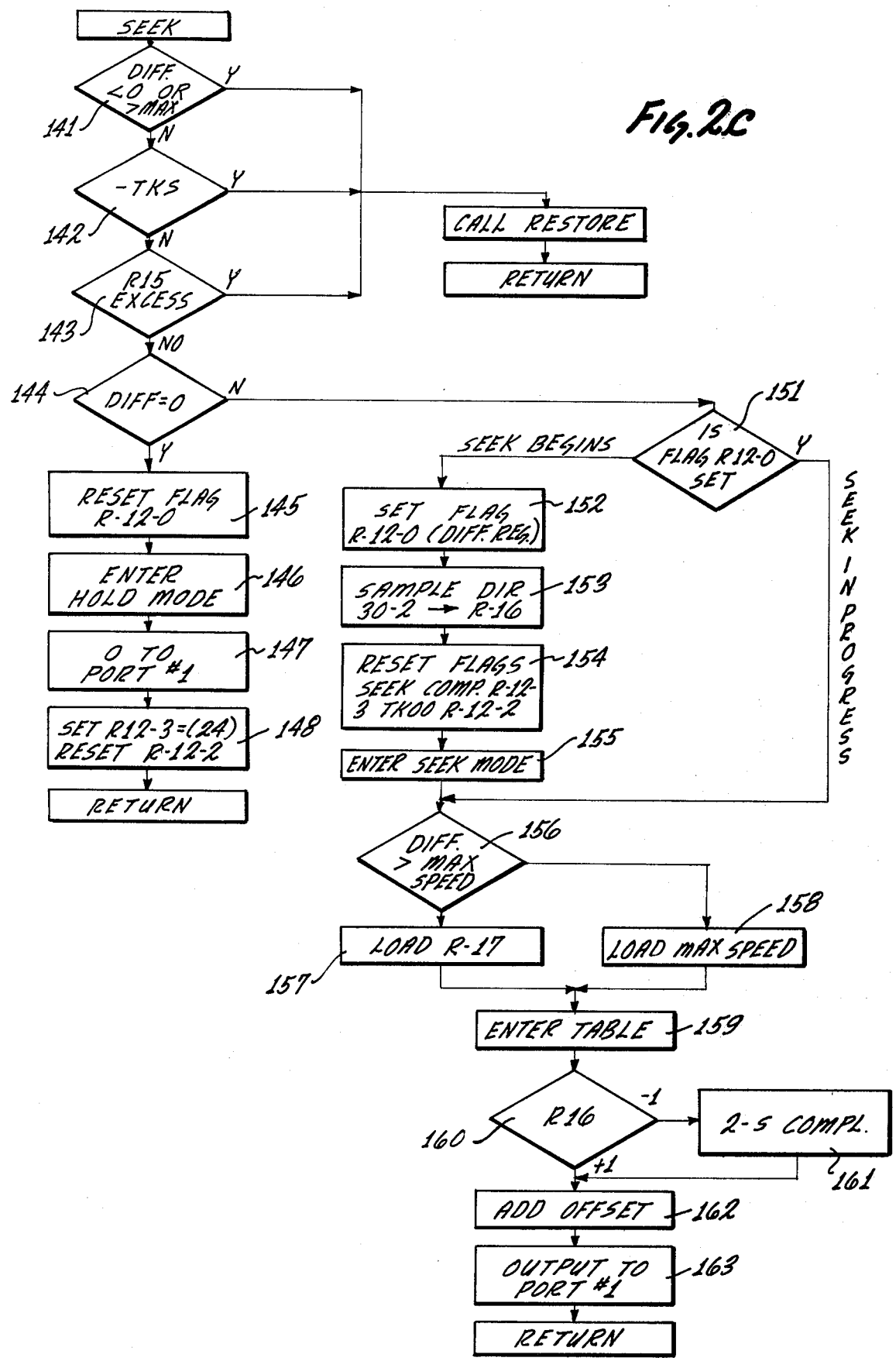

Turning more to FIG. 2c, block 141, it is inquired in the beginning whether or not the difference register has a negative content or a content in excess of 152. If that is so, the voice coil motor and transducers are in an incorrect and undesirable position. There may have been an accidental overshoot due to a mechanical or any other interference or the drive may have experienced an impact causing a mispositioning of the voice coil motor and of the transducer carriage. In this case then, affirmative answer may result from the inquiry as per block 131 and the restore routine will be called which, as will be described below, cause the voice coil motor to position the transducers 12 above track 00.

The content of the difference register may not necessarily reflect this particular incorrect positioning; rather the signal −TKS (detector 26) as interrogated may indicate tht the carriage is in an off position. If that is so, inquiry 142 produces an affirmative answer and again, the restore routine will have to be called upon. Finally, the inquiry as per block 143 may indicate that the absolute track counter has determined that the voice coil motor has positioned the transducers above a non-existing track, and again, the restore routine is being called.

If and/or after all these inquiries have returned negative answers, the restore routine is either not necessary at all at this point, or has placed the transducer above the TK00 track. Next the inquiry 144 determines whether or not the content of the difference register R-17 is zero. If that is so, the program continues to 145 and clears the flag bit R-12-0. This flag is used as an indicator that the content of the difference register R-17 is, in fact, zero. As per blcok 146 the hold state is, or could be, entered. For reasons of completion it should be interjected that this is, in fact, a redundancy and safeguard because the difference register usually holds a zero content on account of the interrupt routine following the acquisition of the particular detent pulse, which has caused the content of the difference register to become zero, resulting immediately in the hold state (see FIG. 2b, 131, 132 to be described below.)

Next, for the persistence of the hold state, a zero signal is applied to the port #1 (147) feeding the digital to analog converter 35. Presently a speed signal zero is applied to the velocity command line to make sure that an unwanted speed is not applied to the motor control circuit during the hold mode should, for any reason, the output of the digital to analog converter 35 be accidentally coupled to the speed control circuit.

Finally (148) the seek complete flag and the TK00 flag are set or reset as the case may be, or, if they are already in these states, the respective states are reconfirmed. Specifically, the data line connected to amplifier 24 is sampled to determine absence or presence of the "near track" signal. A "near track" signal occurs and is present as long as the transducers are within a 1 mill range of the respective center of the tracks above which they are to be retained in the hold mode. A seek can be regarded as completed whenever the transducers 12 are sufficiently close to the desired track center so that data reading or writing can now take place. Thus, the output of amplifier circuit 24 is sampled and the seek complete flag (R-12-3) is set when the "near track" signal occurs. This, of course, is exactly true only if a zero content of the R-17 register was just detected for the first time and the hold mode has just been extended. However, reconfirming the state of the seek complete flag on a running, i.e., repeated basis is advisable, if for any reason the transducers become misaligned and the output of amplifiers 24 changes state. A false seek complete flag signals to the controller that data flow better cease as incorrect writing or reading could result. As far as the TK00 flag is concerned, the flag is simply set or reset depending upon the signal level in the data line which is connected to detector 29b. The states of these flags are outputted during the select routine. Thereafter, the seek routine is existed, and the main loop as per FIG. 2a is continued.

The alternative situation as per inquiry 144 exists, of course, if the content of the difference register R-17 is not zero. This will occur (a) if the system is already in the seek mode or (b) if in the hold mode, upon receipt of a, of a first, step pulse via the step branch of the interrupt routine which was described earlier. In fact, the routine branch to be described next is the earlier announced processing of any step pulse, including the first one which announces to the system that the controller requests a seek.

The seek routine branches to an inquiry 151 for testing whether or not the flag R-12-0 is not set. The state of that flag is in indication whether or not this is the first time during executing the main program that a non-zero content of the difference register was detected.

In fact, the system is still in the hold mode, the seek flag R-12-0 is now being set (157). Next, the interface "direction" line 30-2 is sampled (153) and the content is set into the appropriate flag stage such as the one particular bit in the register R-16. The controller will identify one direction by a +1 bit to be set into register R-16; for the opposite direction a negative bit is provided in line 30-2 and now set into the register. Next (block 154), the seek complete and TK0 flags are internally reset (R-12-3 and R-12-2). These flags will be outputted to the controller during the select routine when executed as part of the main program loop.

Next (block), the seek mode is being entered. If the inquiry as to block 151 determined that the seek flag R-12-0 was already set, then by necessity the system is already in the seek mode and the program branches to inquiry 156 at which point it will also arrive in the case of the alternative branch, following the entry into the seek mode, block 155.

After it is firmly established that the system is in the seek mode, the determination is now made (156) whether or not, in fact, the content of the difference register is above a particular maximum number. Following the acquisition of a first step pulse and entry in the seek mode, this will not be the case, but after many step pulses have arrived, this situation may, indeed, arise. If it has, the A register receives the digital number being the equivalent of or representing a maximum speed number; the motor 15 should not move at any higher speed. If the content of the difference register is not larger than that maximum track difference number the particular difference is set into the A register (blocks 157 and 158, respectively).

Next, the speed table is looked up and the resulting output is converted into its two's complement (161) for movement in one particular direction if the flag R-16 indicates that the direction of movement requires this conversion (inquiry 160); otherwise the table value is used directly. In either case, a digital offset value equivalent to half the maximum output of converter 35 is added next (162).

It will be recalled that the digital to analog converter 35 (FIG. 1) operates in one range only and provides an unidirectional output, using values below half of the maximum output for speeds in one direction and the upper range or outputs for speeds in the opposite direction. It will be recalled further that proper polarity for the analog speed command is restored algebraically by source 36 (FIG. 1). The digital offset being added by the program (162) is the digital equivalent of that half maximum value. Thus, the speed values resulting from values taken from the memory table to which the digital offset has been added, occupy a range of digital numbers between half and full maximum, while the offset plus the two's complement of the values from the table occupy the range between zero and the half maximum value.

The resulting digital output is fed to the port 1 (163) to be used by the digital to analog converter 35 for the formation of a particular analog speed command signal. The analog offset (source 36) at the output circuit of the converter 35 compensates by means of the algebraic offset the digital offset as just described, so that the correct speed signal is produced as command for amplifier 20 and for the carriage motor 15.

These operations constitute the generation of the primary speed command for the voice coil motor and its speed loop. That command will be continuously updated and augmented following each interrupt in which another step pulse is received and acknowledged on a maximum priority basis. Outputting this speed command completes the seek routine.

The interrupt routine for the reception of detent pulses causes an augmentation of the difference register tending to reduce its content and, therefore, the speed command signal. The speed command signal, whatever its value, is always produced and updated each time the seek routine is executed in the main program.

The alternative branch of the interrupt routine in FIG. 2b acquires and processes these detent pulses to reduce the content of difference register R-17 until that content is zero, and during the next execution of the seek routine, the branch 144-Y-145, etc., will maintain the hold mode.

It will be recalled, that in the case of an interrupt an inquiry is always made (121) whether or not the detent pulse flip-flop 43-2 is set as detent pulses have a higher priority as to their acquisition. If that inquiry results in a positive answer, the interrupt routine branches to block 127 of the detent pulse acquisition routine, for serving the accumulator content. Next, as per block 128, the difference register R-17 is decremented, but only once because two detent pulses are produced when the carriage 13 moves radially by a full track to track distance. Next (block 129), the content of register R-16 is added to the content of register R-15. The register R-16 is used only with regard to one particular digit. it was loaded and holds the number +1 if, during the seek routine, the input of the data bus line 30-2 was indicative of a selected direction command for moving the voice coil motor and carriage in radial outward direction. The content of that register R-16 was set to −1, if that select direction command signal 30-2 indicated the opposite direction. In fact, therefore, the digital significance of the content of register R-16 is such, that it assigns to a detent pulse, being indicative of a passage of the carriage and the transducer 12 across a data track, a direction, as far as movement relative to the spinning axes of the disk is concerned. Register R-15, on the other hand, is the absolute track counter, i.e. it holds a number which indicates the current position of the transducer 12 in accordance with an assigned number and counting scheme. Therefore, as the detent pulse is being received and processed, unity is either added or subtracted from the absolute track current number depending upon the actual direction of movement, to thereby keep track, in absolute terms, of the position of the tranducers 12.

As per block 130, the flip-flop 43-2 is cleared (signal per line 40-4). Next (block 131), inquires are made as to the content of difference register R-17, i.e. whether the last decrementing reduced its content to 0. It can readily be seen that, if fact, this is the earliest possible moment within program execution in which this particular test when made could successfully result in an affirmative answer. As the transducer carriage is moved over a number of tracks equal to a difference number initially commanded to the drive by means of one or more step pulses the content of register R-17 is necessarily not zero as long as a corresponding number (twice that number) of detent pulses has not been returned by the transducer 16.

An affirmative answer at this point is the earliest possible moment in which arrival at the destination is manifested. Presently we assume that, indeed, this detent pulse was the last one, and the seek mode must be terminated and the hold mode entered (block 132). The signal levels in lines 40-1 and 40-2 are exchanged.

The newly generated hold signal is applied to the gate 21, to thereby close the position and hold loop for the voice coil motor. Currently, of course, the seek mode signal previously issued by the computer 40 to the gate 22, is discontinued. This means that the velocity signal, whatever its value still may be (it should have been close to 0) as was just previously applied by the digital to analog converter 35, is dropped as the motor amplifier 20 is now placed under control of a feedback signal (from transducer 17) which is directly representative of the position of the transducer relative to the destination track. Following entry into the hold mode, the content of the accumulator prior to this interrupt routine, is restored (block 133), and the program returns to the main program as per FIG. 2a.

In the case of an interrupt and following a successful determiation that the interrupt was caused by a detent pulse, may indicate inquiry 131 that the content of difference register is not 0. This will be the case as long as the transducers are not yet near their destination. If so, the routine branches to an inquiry 133 to determine whether or not the content of the difference register exceeds the above mentioned maximum speed number. If, in fact, the difference register R-17 holds a number larger than that number, the carriage moves at maximum speed and a new speed command signal is not to be generated. Thus, if the current track difference is (still) larger than the particular number, any intervention in the speed control is not needed. It will readily be understood that before this difference can possibly exceed this particular number, a difference below that maximum must have occurred earlier on account of many step pulse interrupts, which "build up" the difference to the number that provided the particular maximum speed command.

If the number of tracks to be transversed is less than that maximum speed number, the program proceeds to block 135, according to which the content of the register R-17 is used in the look-up table of the ROM to extract from that table a particular velocity value. For a difference in R-17 equal to the maximum number just referred to, the table holds the maximum speed command. Next, it is inquired (block 136) in which direction the motion is to occur. It will be recalled that this particular information is contained in the flag register R-16. In one instance, one uses the content of the table directly as such a speed value; in the other instance the 2's complement is formed (block 137).

Next (block 138), the offset value is added to that particular number to, in effect, redefine the 0 level of requisite motion. Thereafter the number as taken from the memory table plus offset is outputted (139) through port #1 of the microcomputer to apply this particular digital number to the digital to analog converter 35.

It can, thus, be seen that at the end of this particular interrupt routine, following a determination that the transducers 12 are, in fact, not yet above the desired track, an updated, possibly reduced velocity is outputted by the computer and furnished via the digital to analog converter 35 to the motor speed loop as velocity command signal. This, of course, is possible only if, in fact, the system is in the seek mode which it is (or should be) whenever detent pulses appear. As far as this particular interrupt routine is concerned, following the application of the new speed value to the digital to analog converter 35, the content of the accumulator is restored (block 133), and the computer returns to the interrupted program.

Figure 2D:
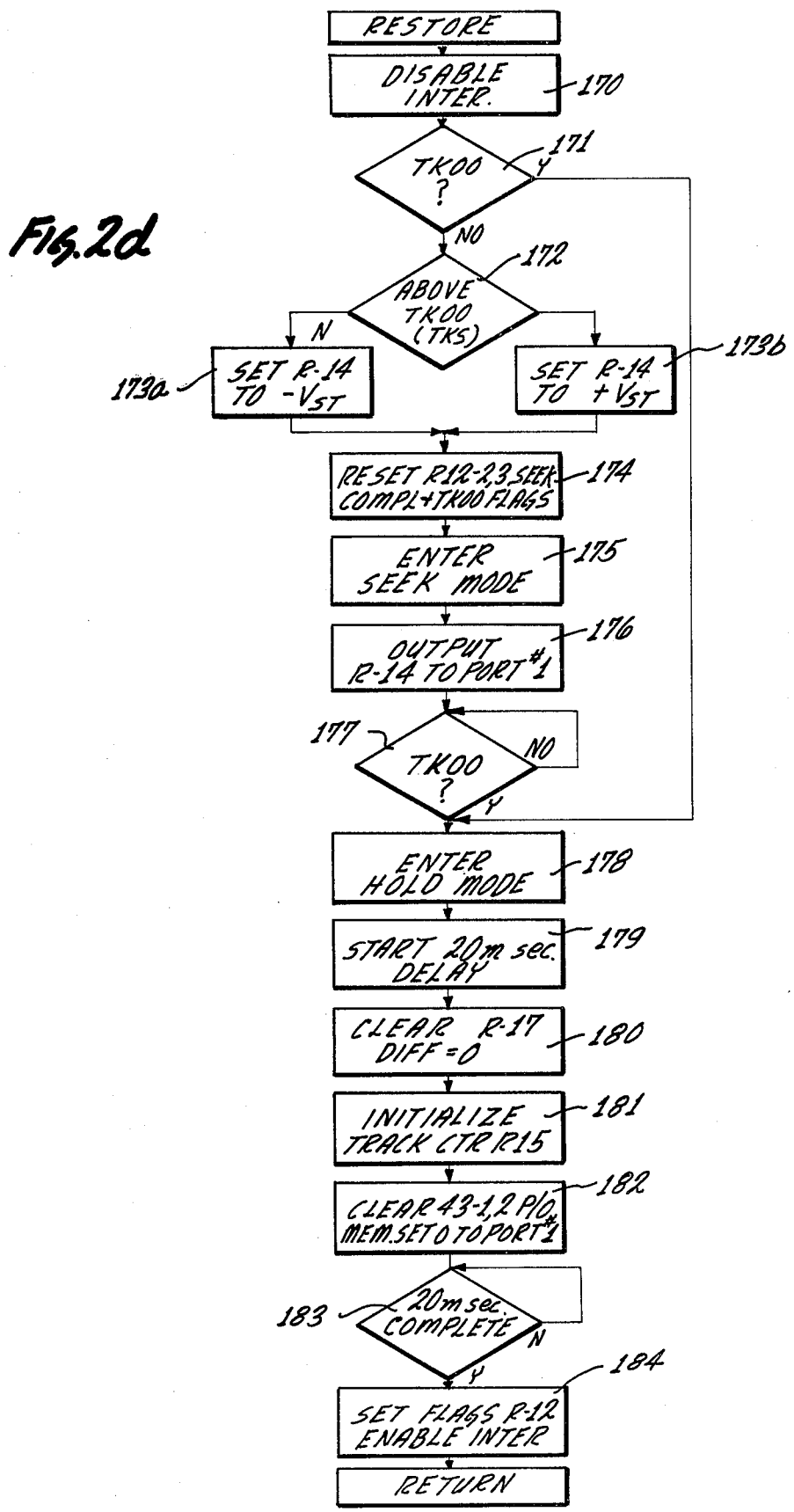

The "restore" sub-routine, repeatedly alluded to above, will be described with reference to FIG. 2d. This particular sub-routine provides for the restore function whenever called, which means that the voice coil motor is controlled to cause the transducer 12 to be located above the outermost track 00. Three instances have been described earlier in which the restore routine is being called (141, 142, and 143—FIG. 2c) pursuant to and in the beginning of the execution of the seek routine. There are, however, other instances in which that routine is called. For example, during start up (block 104), the whole system is initialized and the transducers are moved to that start up track. Also, a restore command may issue externally by the controller via the interface line 30-3 to the microcomputer 40. That particular line is sampled during the select routine which was described as part of the main program loop. In any event, whenever the restore routine is called, the first operation (170) is to disable the interrupt channels to prevent at this point any acceptance of detent and step pulses. Next, it is determined (171) whether or not the transducers 12 are already above the track 00, which means that the input line for the TK00 signal (detector 29) is being sampled. If, in fact, transducers 12 are on track 00, the sub-routine continues to 178 to enter the hold mode. If the transducers are not above the 00 track, the inquiry as per block 172 samples the output of detector 26 to determine whether the transducers 12 are to one side or the other of that zero-zero track. In one case, the content of scratchpad register R-14 is set to a value equivalent to a negative restore velocity; in the other case, the content of the register R-14 is set to a positive restore velocity (blocks 173a and 173b). Thereafter, the seek complete flag output line 30-5 as well as the line 30-6 for the TK00 flag receive signals to indicate that now a seek operation is going to take place, and that the system is not above the desired track, which is, in this case, the 00 track. The flags in register R-12 are not modified; they could be but that is not necessary. Necessary is to signal to the controller promptly that the drive is occupied with a restore operation and cannot yet accept any control signals such as step pulses.

Next, the seek mode is entered as per block 175. As per block 176, the content of the register R-14 is outputted to the digital to analog converter 35. The seek enable signal has, in the meantime, already opened gate 22 so that the restore velocity is applied to the motor control circuit as a speed command signal. These restore velocity values represent relatively low constant speeds.

The sub-routine now enters into a small loop 177 in which continuously an inquiry is made whether or not the 00 track has been reached already while the particular speed command signal for the restore operation is applied to the motor circuit. As soon as detector 29 signals that the transducers 12 have arrived above the 00 track, the loop is broken and the hold mode is entered as per block 178, whereupon the transducers are held above that 00 track.

Next, a delay of 20 milliseconds is started to permit the motor feedback loop to stabilize the position of the transducer to the hold and positioning mode position. Following the beginning of that 20 millisecond delay, the difference register as well as a portion of the memory are cleared (block 180), and the absolute track counter is initialized to a count value which is equivalent to that 00 track. Logically, this should be zero, but it was found practical to use a different number scheme for absolute track counting using positive and negative values and a zero track count somewhere within the track band to coincide with the situation in which the current for the circuit which writes the data on each track is to change magnitude. This aspect is not of immediate significance for the drive control.

As per block 181, a zero signal is applied to the input of the digital to analog converter 35, to provide, as is usual in the hold mode, a zero speed command signal. Next, the detent and step interrupt flip-flops 43-1 and 43-2 are being cleared because, even if they are set at that point, following a restore operation, the content of these flip-flops will be disregarded, in other words, any change in track positioning must be commanded anew by the controller 30. It will be recalled that the restore routine may have been entered because there was some positioning error within the system. Therefore, this restore routine has a self-correcting aspect. Following the clearing of the interrupt flip-flops as per 182, the program waits for the expiration of the 20 millisecond period (loop 183), whereupon the seek complete and TK00 flag are being set (block 184) internally. The interrupt channel is internally enabled, which means that the system is now again in a condition of accepting interrupt signals which, of course, will be a step pulse commanded from the controller after the flags have been outputted. The select routine will thereafter be executed, pursuant to the main loop and that routine will output these flag data, if and when the particular drive is selected.

It is a particular feature of the drive system that the microcomputer used within the drive contains its own diagnostic and exercising program. It is merely necessary to select, for example, manually a particular test by means of the test switch 44. Whenever a particular test is set during the execution of the main program, and here particularly pursuant to the inquiry 109 (FIG. 2a), it is determined whether or not a particular test number has been set. Previously, we assumed that a test condition was not set, but if a test number has been set, it is identified and that particular number causes the program to branch to the particular test routine. Among the several possible tests is a test which could be called "super crescendo" test. This test constitutes a sequence of seek operations, the sequence including in effect all possible seeks. Basically, the super crescendo test causes a seek from every track to every other track. Particularly, the content of the difference counter is loaded initially and after a particular seek has been completed, the difference counter is loaded again with a different difference, etc., the sequence of updating follows a particular pattern. One needs two auxiliary registers here (internal to 40), one of which contains a "base" track number, the other one contains variable track numbers. The variable track number is stepwise updated to cover all tracks to perform seek operations from the base track to all the other tracks. After having completed such a sub-sequence, the base track register is incremented, and gain, the plurality of seek operations as described is carried out again until the base track register has contained all of the possible track numbers.

Another test is a basic exerciser test in which the unit simply seeks in between two selected tracks. After having completed the seek from one track to the other one, it performs the seek from the latter to the former, and so forth, in continuous sequence for as long as that particular task remains selected.

We claim:

1. A disk drive having at least one spinning disk, a carriage for at least one transducer to be positioned adjacent to the disk for interaction therewith for data recording and/or retrieval, the carriage with the transducer being movable in radial direction for positioning above one of a plurality of concentric tracks on the disk; an electric motor for driving the carriage; and a control circuit for the motor comprising:

transducer means operatively coupled to the carriage for sensing the disposition of the carriage and producing a periodically variable output signal representative of the relative disposition of the carriage and the transducer thereon;

amplifier means connected to the motor for providing thereto a control signal for controlling the motor, further having an input means connected for receiving error type signals;

a first feedback loop including analog circuit means and connected to be responsive to said output signal and feeding it to the said input means, further including first gate means connected for enabling and disabling the first feedback loop;

a second feedback loop also connected to the output circuit of the transducer means and deriving from the output signal a train of pulses corresponding to the periodicity thereof, the pulses being representative of the passage of the carriage transducer across the tracks of the disk, the second feedback loop further including a microcomputer means having an interrupt input, there being circuit means to connect the interrupt input to receive said train of pulses, the microcomputer having an output port, the second feedback loop further including a digital to analog converter to provide output signals to the input means in response to a digital signal on the port, there being second gate means connected for enabling and disabling the second feedback loop;

external circuit means connected to provide pulses to the interrupt means commanding and representing number of tracks over which the carriage transducer is to be moved;

first program means in the microcomputer for causing the content of a register in the computer to be incremented in response to the pulses as provided by the external circuit means and to be decremented in response to the pulses of the second feedback loop, the first program means including interrupt routines for the separate acceptance of the pulses from the external circuit means and from the second feedback loop;

second program means in the microcomputer for providing digital speed command signals to the said port in response to the content of the register; and third program means for providing signals to the first and second gate means for enabling the first feedback loop in response to a particular content of the said register and for enabling the second feedback loop in response to a content of the register different from the particular content.

2. A disk drive and control circuit as in claim 1, further including a program loop means for sequentially monitoring the operating state of the drive, determining the content of said register and including the second program means for the providing of said speed command signals and including third program means for enabling the second feed back loop.

3. A disk drive and control circuit as in claim 2, further including fourth program means for causing a particular speed command signal to be applied to said port to move the transducer to a position above a reference track, the fourth program means operatng in response to detection of particular operating states as monitored.

4. A disk drive and control circuit as in claim 2, the second program means having a first portion operating as part of said loop, and a second portion likewise providing speed command signals in response to an interrupt caused by pulses from the second loop and immediately following the decrementing.

5. A disk drive having at least one spinning disk, a carriage for at least one transducer to be positioned adjacent to the disk for interaction therewith for data recording and/or retrieval, the carriage with the transducer being movable in radial direction for positioning above one of a plurality of concentric tracks on the disk; an electric motor for driving the carriage; and a control circuit for the motor comprising:

transducer means operatively coupled to the carriage for sensing the disposition of the carriage and producing a signal representing the position of the transducer relative to any of the tracks and further producing detent pulses indicative of passage of the transducer across the disk;

a first feedback loop including the transducer means and connected to be responsive to said position signal for position control said motor;

a second feedback loop including the transducer means and microcomputer means having interrupt means connected to be responsive to said detent pulses, further having output means to provide a speed command signal to said motor, the microcomputer means including a register and a speed value table, and further including means for providing enabling signals for and to the first and second feedback loops to enable one to the exclusion of the respective others;

program means included in the microcomputer and responsive to said detent pulses as received by the interrupt means to modify immediately the content of the register and causing an updated speed value from the table to be extracted therefrom in response to the modified content of the register and applying the extracted value to said port; and to change the enabling of the loops from the second to the first upon detection of a particular value in the register, immediately following a detent pulse that modified the register content to the particular value.

6. A drive and control circuit as in claim 5, including circuit means to be responsive to external pulses for updating the content of the register.

7. A drive and control circuit as in claim 6, wherein the circuit means is connected to the interrupt means, the interrupt means causing the register content to be updated on a priority basis being higher than the interrupt priority for the detent pulses.

8. A disk drive having at least one spinning disk, a carriage for at least one transducer to be positioned adjacent to the disk for interaction therewith for data recording and/or retrieval, the carriage with the transducer being movable in radial direction for positioning above one of a plurality of concentric tracks on the disk; an electric motor for driving the carriage, the drive further having means for receiving step pulses being indicative of repositioning the transducer vis-a-vis the tracks; a control circuit for the motor comprising:

- a microcomputer including a particular register, further including a stored speed table and program means for using the content of the register to derive from the table a speed value and applying it to a port;
- a digital-to-analog converter connected to the port and responding to said speed value and providing a speed command signal to said motor;
- means for deriving pulses from the carriage upon movement thereof in the radial direction;
- first program means for running the microcomputer in a loop which includes sequentially sampling whether or not the drive has been selected for operation and for applying the content of said flags to the output lines, the loop further including selecting from the table a speed value depending upon the register content and outputting the value to said port; and
- second program means including interrupt means responding to the step pulses and interrupting the execution of said loop, for updating the content of said register, further responding to the detent pulses for decrementing the content of said register and immediately thereafter modifying said speed on the basis of said table to output a modified speed.

* * * * *